Oct. 9, 1934.  M. W. McCONKEY  1,976,451

BRAKE

Filed Feb. 11, 1929

INVENTOR
Montgomery W. McConkey

Patented Oct. 9, 1934

1,976,451

UNITED STATES PATENT OFFICE 1,976,451

BRAKE

Montgomery W. McConkey, South Bend, Ind., assignor to Bendix Brake Company, South Bend, Ind., a corporation of Illinois Application February 11, 1929, Serial No. 338,999

20 Claims. (188—79.5)

This invention relates to brakes, and is illustrated as embodied in an internal expanding brake for an automobile.

An object of the invention is to provide a simple and inexpensive but efficient adjustment for a brake or the like, preferably including a pair of interengaging wedge members with externally-cylindrical faces pivotally seated in sockets in the ends of the shoes or their equivalents. Another object of the invention is to simplify the structure of the wedge members, and the means for operating them.

A feature of the invention relates to novel centering means for the friction parts of the brake, which may be used with the adjustment. Preferably this means includes a resilient lever or member, such as a leaf spring, carrying a centering member acting to return the brake friction means to initial position when the brake is released.

The above and other objects and features of the invention, including various combinations of parts, and various desirable structural features, will be apparent from the following description of two illustrative embodiments shown in the accompanying drawing, in which.

Figure 1:
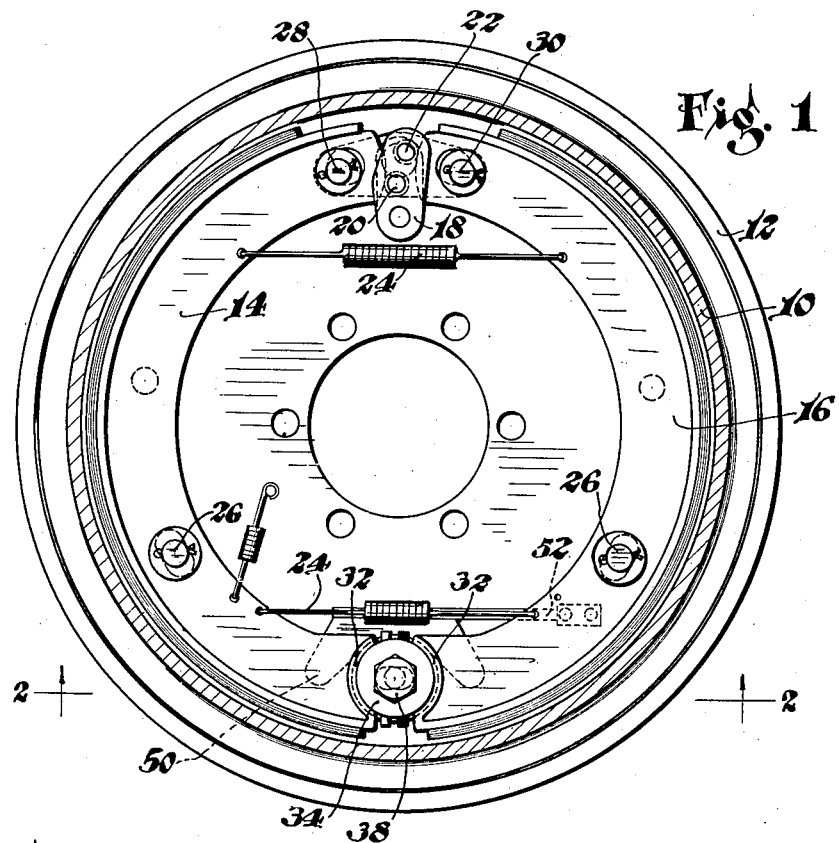
Figure 1 is a vertical section through the brake, just inside the head of the brake drum, and showing the brake shoes in side elevation.
Figure 2:
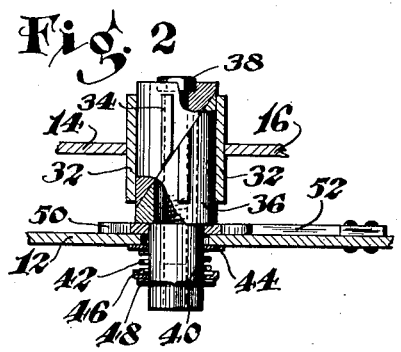
Figure 2 is a partial section on the line 2—2 of Figure 1, showing the novel adjustment and the novel centering means.

The illustrated brake includes a rotatable drum 10, at the open side of which is a support such as a backing plate 12, and within which is arranged the friction means of the brake, shown as comprising a pair of interchangeable shoes 14 and 16. The brake is applied by means such as a floating lever or cam 18 having rollers or the like 20 and 22 in thrust engagement respectively with the shoes 14 and 16, the lever or cam acting against the resistance of coil springs 24 tensioned between the shoes. Suitable shoe-positioning devices or steady rests 26 may be provided. When the drum is turning clockwise, shoe 14 anchors against a fixed post 28; and when the drum is turning counter-clockwise the shoe 16 anchors against a fixed post 30. The anchor posts 28 and 30 pass through suitable slots in the webs of the shoes 14 and 16.

At their lower ends, the webs of the shoes are or may be cut away on semi-circular curves, and semi-cylindrical stampings or equivalent parts 32 welded or otherwise secured thereto. Parts 32 form sockets pivotally receiving and engaging wedge members 34 and 36 having inclined faces wedgingly engaging each other. Member 34 has a polygonal socket in its end, to receive the head of a bolt 38 passing through relatively large openings in both wedge members, to hold the bolt against turning, the bolt having threaded thereon an elongated nut 40 engaging member 36 and passing through an opening in the backing plate so that it can be operated from outside the backing plate. Wedge members 34 and 36 are shown with projecting lugs engageable after some lost motion with the upper and lower edges of sockets 32, thereby preventing the wedge members from turning out of the sockets while the brake is being adjusted.

A coil spring 42 is shown sleeved on the nut 40, and is compressed between a washer 44 slidably engaging the backing plate and a washer 46 held on the end of nut 40 by means such as a cotter pin 48. Spring 42 holds the shoe assembly against lateral movement, and prevents rattle of the parts.

When the brake is released, the shoes are preferably returned to their initial positions, at their lower ends, by novel centering means shown as including a double wedge shaped member providing a notch 50 embracing nut 40 just inside the backing plate, clearly shown in dotted lines in Figure 1. Wedge 50 may be fixed at the end of a novel resilient member such as a leaf or wire spring 52 riveted or otherwise fixedly secured to the backing plate at its other end. Movement of nut 40 in either direction from its initial centered position actuates wedge 50 to flex the spring 52. When the brake is released, the spring 52 acts through the wedge 50 to return the nut 40 to its initial centered position.

Figure 3:
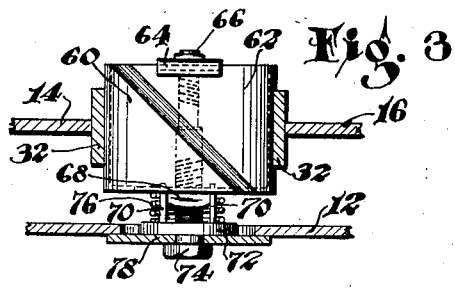
Figure 3 is a partial section corresponding to Figure 2, but showing a modification of the adjustment.
Figure 5:
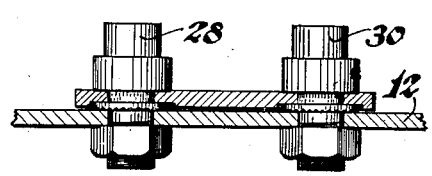
Figure 5 is a partial section showing the brake anchorage on an enlarged scale.
Figure 4:
Figure 4 is an end elevation of the adjustment of Figure 3, looking downwardly in Figure 3.

In the arrangement of Figures 3 and 4, the adjustment includes two wedge members 60 and 62 made as steel stampings. Both of these stamped wedge members have semi-cylindrical faces seated in the sockets 32, and extended to form flat parallel sides having inclined edges. These inclined edges of member 60 are in wedging engagement with those of member 62, and are shown as being channel-shaped and slidably embracing the outwardly-turned edges of member 62.

In this arrangement, a stamping 64 seated on the end of member 62, and formed with parallel grooves to embrace the end edges of member 62, is formed to embrace a nut 66 and hold it against turning. A second nut 68 engages a flange on the end of member 60, and is held against turning by tongues 70 on a washer 72, which tongues embrace the nut and project into a slot in member 60 provided for an operating member or bolt 74, thus holding washer 72 against turning. Bolt 74 has a right threaded portion and a left threaded portion to receive the nuts 66 and 68, one of the nuts being a righthand thread and the other a lefthand thread to correspond. Thus turning bolt 74 draws nuts 66 and 68 toward each other to wedge shoes 14 and 16 apart.

A spring 76 confined between member 60 and washer 72 holds the parts against rattling or other lateral movement, washer 72 being welded or otherwise secured to a larger washer 78 slidably engaging the outer face of the backing plate. Bolt 74 extends through an opening in the backing plate, so that it can be operated from outside the backing plate.

While two illustrative embodiments have been described in detail, it is not my intention to limit its scope to those particular embodiments, or otherwise than by the terms of the appended claims.

I claim:

1. Adjusting means pivotally connecting a pair of brake shoes or the like comprising a pair of members having inclined faces in wedging engagement with each other and formed with curved external surfaces adapted to seat pivotally in sockets in the ends of the shoes, in combination with means for forcing said members in opposite directions to expand the joint between the shoes to compensate for wear.

2. Adjusting means connecting a pair of brake shoes or the like comprising a pair of members having inclined faces in wedging engagement with each other and formed with external surfaces adapted to seat in sockets in the ends of the shoes, in combination with means for forcing said members in opposite directions to expand the joint betwen the shoes to compensate for wear.

3. Adjusting means pivotally connecting a pair of brake shoes or the like comprising a pair of members having inclined faces in wedging engagement with each other and formed with curved external surfaces adapted to seat pivotally in sockets in the ends of the shoes, in combination with threaded parts engaging the end faces of said members and operable to force them in opposite directions to expand the joint between the shoes.

4. Adjusting means connecting a pair of brake shoes or the like comprising a pair of members having inclined faces in wedging engagement with each other and formed with external surfaces adapted to seat in sockets in the ends of the shoes, in combination with threaded parts engaging the end faces of said members and operable to force them in opposite directions to expand the joint between the shoes.

5. Adjusting means connecting a pair of brake shoes or the like comprising a pair of members having inclined faces in wedging engagement with each other and formed with external surfaces adapted to seat in sockets in the ends of the shoes, in combination with parts engaging the end faces of said members and jointly operable to force said members in opposite directions.

6. Adjusting means connecting a pair of brake shoes or the like comprising a pair of members having inclined faces in wedging engagement with each other and formed with external surfaces adapted to seat in sockets in the ends of the shoes, in combination with a bolt engaging one of said members and a nut threaded on the bolt and engaging the other of said members and operable to force said members in opposite directions to wedge the shoes apart.

7. Adjusting means comprising a pair of externally-cylindrical members having inclined faces in wedging engagement with each other and having end parts opposite each other, and an operating bolt extending axially of said members and having a head operatively engaging one end part and a nut operatively engaging the other end part.

8. Adjusting means comprising a pair of externally-cylindrical members having inclined faces in wedging engagement with each other, together with parts for operating said members, and centering means acting on one of said parts.

9. A brake comprising, in combination, a pair of shoes connected by an expansible joint including a pair of wedge members, operating means actuatable to cause said members to wedge the shoes apart, and centering means engaging and acting on said operating means.

10. A brake comprising, in combination, a pair of shoes connected by an expansible joint, and a resilient lever flexed by movement of said joint and serving to return the joint to initial position when the brake is released.

11. A brake comprising, in combination, shiftable friction means, and a resilient lever flexed by shifting of the friction means and acting to return the friction means to its initial position when the brake is released.

12. A brake comprising, in combination, a drum, friction means shiftable to different anchored positions when the drum is turning in opposite directions, and a resilient lever flexed by shifting of the friction means in either direction and acting to return the friction means to its initial position when the brake is released.

13. Brake centering means comprising a resilient member having one portion fixed and having another portion carrying a centering wedge moved by flexing said member.

14. Brake centering means comprising a resilient member having one portion fixed and having another portion carrying a double wedge moved by flexing said member.

15. A brake centering device comprising a resilient spring member having a wedge fixedly mounted at one end.

16. Adjusting means for connecting a pair of brake shoes or the like comprising a pair of members having inclined faces in wedging engagement with each other and formed with external cylindrical surfaces adapted to seat in sockets in the ends of the shoes, in combination with a nut non-rotatably engaging each of said members, and an operating part having right and left threaded portions on which said nuts are threaded respectively.

17. Adjusting means comprising a pair of externally-cylindrical stampings having inclined edges, the edges of one formed as channels wedgingly receiving the edges of the other.

18. Adjusting means comprising a pair of externally-cylindrical stampings having inclined portions in wedging inter-engagement and operating means for the stampings extending along the axis of the stampings.

19. A brake adjusting wedge comprising a stamping having an externally-cylindrical portion extended to form flat sides terminating in inclined wedge portions at their edges.

20. The combination of a brake shoe; a journal to which said brake shoe is pivotally connected, said journal comprising two members each formed with an inclined surface engaging the inclined surface of the other member; means to prevent rotation of said members relative to each other; and means for adjusting said members to provide a snug fit between said journal and said brake shoe.

MONTGOMERY W. McCONKEY.